United States Patent [19]
Sickles et al.

[11] Patent Number: 6,157,006
[45] Date of Patent: Dec. 5, 2000

[54] HIGH HUMIDITY APPARATUS

[75] Inventors: Willard J. Sickles, Dalton; Bradley J. Carlson, Wilkes-Barre; Brett S. Drozic, Kingston; Joseph P. Jones, Wilkes-Barre; David A. Reppert, Brodheadsville; John H. Welsch, Moscow, all of Pa.

[73] Assignee: Metro Industries, Inc., Reno, Nev.

[21] Appl. No.: 09/185,569

[22] Filed: Nov. 4, 1998

[51] Int. Cl.[7] .................................................. A21B 1/00
[52] U.S. Cl. ................... 219/401; 126/20; 99/467
[58] Field of Search .......................... 219/401; 126/20, 126/21 A; 99/467, 474, 476, 447

[56] References Cited

U.S. PATENT DOCUMENTS

| | | | |
|---|---|---|---|
| 4,668,854 | 5/1987 | Swan | 219/273 |
| 5,680,810 | 10/1997 | Sham | 99/330 |
| 5,802,963 | 9/1998 | Cohn et al. | 99/476 |
| 5,967,020 | 10/1999 | Soyama et al. | 99/327 |

*Primary Examiner*—Teresa Walberg
*Assistant Examiner*—Shawntina S. Fuqua
*Attorney, Agent, or Firm*—Fitzpatrick, Cella, Harper & Scinto

[57] ABSTRACT

A module adapted to generate a stream of hot, humid air includes a housing, a chamber disposed within the housing and having an air intake and an exhaust vent, and a reservoir adapted to hold a volume of water. A blower is disposed adjacent the air intake and is adapted to propel a stream of air through an interior of the chamber toward the exhaust vent. A steam generator is disposed substantially within the interior of the chamber and has a water inlet in flow communication with the reservoir and a steam outlet in flow communication with the interior of the chamber. A first heater is disposed on an external surface of the steam generator and a second heater is disposed within the interior of the chamber.

28 Claims, 6 Drawing Sheets

HIGH HUMIDITY APPARATUS

BACKGROUND OF THE INVENTION

1. Field of the Invention

The present invention relates generally to an apparatus capable of producing hot, humid air, and more particularly to an apparatus adapted to hold food and the like at a preferred temperature and humidity for a period of time.

2. Description of the Prior Art

In the food preparation industry, a variety of applications require food to be held for an extended period of time in a high temperature, high relative humidity environment. For example, in many restaurants food is prepared well in advance of the time at which it is ultimately served. Ideally, in this situation, the prepared food should be maintained at a temperature between 160 to 180 degrees Fahrenheit. Conventional ovens and heat lamps, however, tend to dry out the food.

In another application, a high temperature, high relative humidity environment is needed for the preparation of bakery products. In a process known as proofing, dough is typically stored at a temperature between 80 to 90 degrees Fahrenheit until the dough rises due to a reaction of the yeast contained therein. Unless moist air is present, however, the outside surface of the dough may become brittle and crack.

In an attempt to solve the latter of the two aforementioned problems, U.S. Pat. No. 5,802,963 issued to Cohn et al. discloses a module for producing warm, humid air in a proofing cabinet. The module sits below a section of the cabinet in which racks are provided for holding dough. The module includes an air duct, a blower provided near an intake of the air duct, and a water reservoir and steam generator provided adjacent the air duct. Within the air duct, an electric air heater heats a stream of air as it is blown through the air duct by the blower. As the stream of air blows through the air duct, art immersion heater within the steam generator causes water contained therein to boil, thus producing steam which is injected into the air duct via a steam tube. In accordance with this arrangement, a stream cf warm, humid air is generated and circulated throughout the proofing cabinet.

However, there is a need in the art for an apparatus that is capable of creating and maintaining a hot, humid environment, yet is efficient and user-friendly in terms of both operation and maintenance.

SUMMARY OF THE INVENTION

It is a principle object of the present invention to provide an energy-efficient and user-friendly apparatus adapted to hold food at a preferred temperature for an extended period of time while maintaining a desirable moisture content therein.

Another object of the invention is to provide an apparatus with an energy-efficient steam generator.

Still another object of the invention is to provide an apparatus with an easy-to-clean water reservoir.

According to one aspect of the present invention, an apparatus includes a chamber having an air intake and an exhaust vent, a blower disposed adjacent the air intake and adapted to propel a stream of air toward the exhaust vent, and a steam generator. A heater is disposed at least partially within an interior of the chamber so as to heat simultaneously the steam generator and the interior of the chamber.

According to another aspect of the present invention, an apparatus includes a housing, a chamber within the housing having an air intake and an exhaust vent, and a blower disposed adjacent the air intake for blowing a stream of air toward the exhaust vent. A reservoir is detachably mounted to the housing and is adapted to hold a volume of water. The apparatus also includes a steam generator having a water inlet adapted to receive a fraction of the volume of water held in the reservoir and a steam outlet through which steam can be discharged into the chamber, as well as means for heating the steam generator and means for heating the stream of air as it is blown through the chamber.

According to a further aspect of the present invention, a module adapted to generate a stream of hot, humid air includes a housing, a chamber disposed within the housing and having an air intake and an exhaust vent, and a reservoir adapted to hold a volume of water. A blower is disposed adjacent the air intake and is adapted to propel a stream of air through an interior of the chamber toward the exhaust vent. A steam generator is disposed substantially within the interior of the chamber and has a water inlet in flow communication with the reservoir and a steam outlet in flow communication with the interior of the chamber. A first heater is disposed on an external surface of the steam generator and a second heater is disposed within the interior of the chamber.

Yet another aspect of the present invention includes an apparatus adapted to circulate a stream of hot, humid air. The apparatus includes a cabinet and a module. The cabinet has a feed duct, a return air flow path, and a plurality of air channels allowing for flow communication between the feed duct and the return air flow path. The module includes a housing and a chamber provided within the housing. A stream of air can flow through the chamber from an air intake at one end to an exhaust vent at another end. The air intake is in flow communication with the return air flow path and the exhaust vent is aligned in flow communication with the feed duct. A motor-driven blower is disposed adjacent the air intake and is adapted to propel the stream of air received via the return air flow path through the chamber toward the exhaust vent and into the feed duct. A reservoir is detachably mounted to the housing and is adapted to hold a volume of water having a level. A steam generator assembly is disposed substantially within the chamber and includes a water inlet adapted to receive water from the reservoir, a vessel adapted to hold a volume of water having substantially the same level but a lesser volume than the volume of water held in the reservoir, and a steam outlet through which steam can be discharged into the chamber. A first heater is disposed within the chamber on an external surface of the steam generator, and a second heater is disposed within the chamber at a position intermediate the steam generator and the exhaust vent. A temperature sensor is disposed within the cabinet for measuring the temperature of the stream of air as it is propelled through the chamber, and a humidity sensor is disposed within the cabinet for measuring the relative humidity of the stream of air as it is propelled through the chamber.

These and other objects, aspects, features and advantages of the present invention will become apparent from the following detailed description of the preferred embodiments taken in conjunction with the accompanying drawings.

BRIEF DESCRIPTION OF THE DRAWINGS

The present invention is described in conjunction with the accompanying drawings, in which.

DESCRIPTION OF THE PREFERRED EMBODIMENTS

The advantageous features of the present invention will be described below with respect to a module adapted to generate a stream of hot, humid air, which, in a preferred embodiment, is used in conjunction with a food storage apparatus. Also within the scope of the present invention, however, are other applications for which the module could be adapted, for example, proofing apparatuses.

Figure 1C:
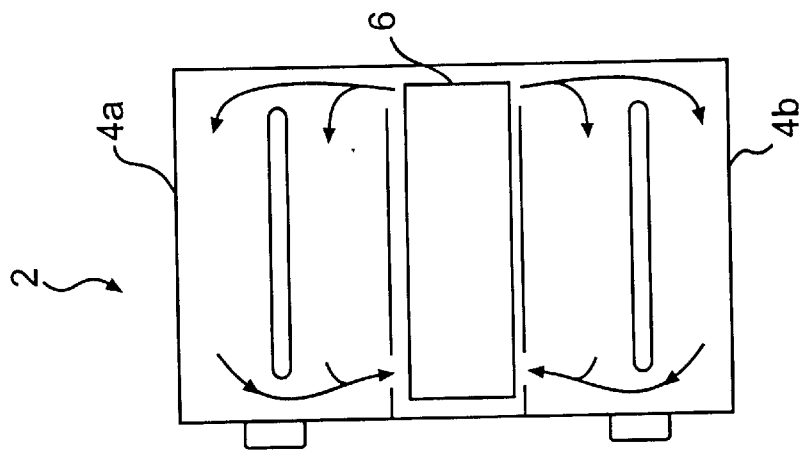
FIG. 1C is a cross-sectional view of a food storage apparatus according to a second alternative embodiment.
Figure 1B:
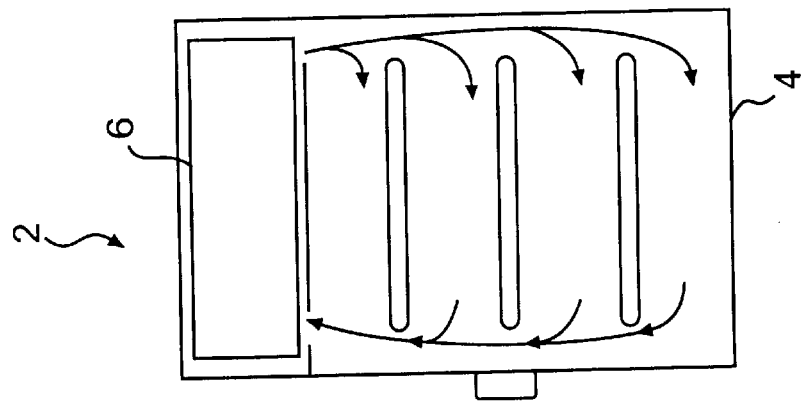
FIG. 1B is a cross-sectional view of a food storage apparatus according to a first alternative embodiment.
Figure 1A:
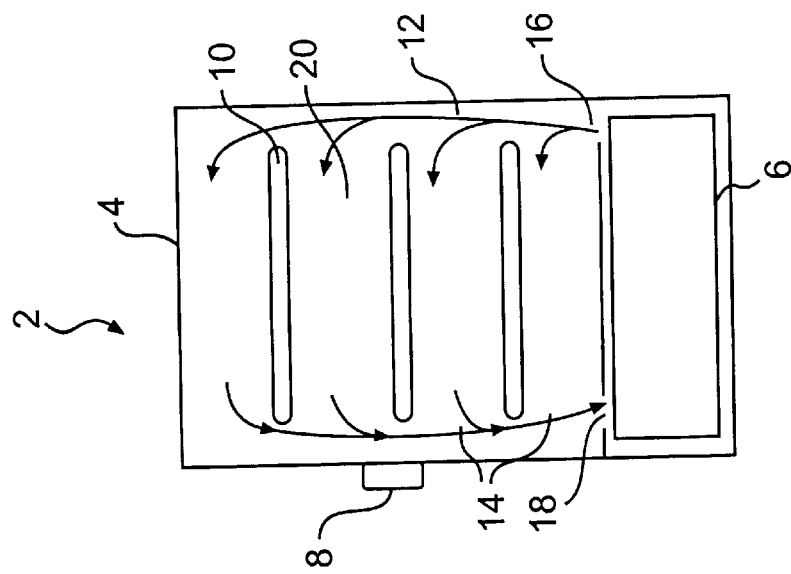
FIG. 1A is a cross-sectional view of a food storage apparatus according to a preferred embodiment.

FIG. 1A schematically shows a food storage apparatus 2 that includes a cabinet 4 and a module 6. A door 8 on the front of the cabinet 4 opens to reveal a plurality of slides 10 for supporting, e.g., pans or food trays on which food can be placed. The cabinet 4 has a feed duct 12 and return air flow paths 14 along rear and front portions of the cabinet 4, respectively. The feed duct 12 is aligned in flow communication with an exhaust vent 16 of the module 6. The return air flow paths 14 are in flow communication with a modular opening 18. In communication with the feed duct 12 and the return air flow paths 14 are a plurality of air channels 20 within the cabinet. Preferably, the cabinet 4 is insulated, although such insulation is not necessary if the cabinet is to be used for a lower temperature application such as proofing.

The above-described configuration is just one of several possible cabinet-module arrangements. Although in a preferred embodiment the module 6 is positioned at the bottom of the food storage apparatus 2, a reverse configuration could be used as well, i.e., where the module 6 is positioned at the top of the apparatus 2, as shown in FIG. 1B. Similarly, the module 6 could be located in a central portion of the apparatus 2 between two cabinets 4a and 4b, as shown in FIG. 1C.

Figure 2:
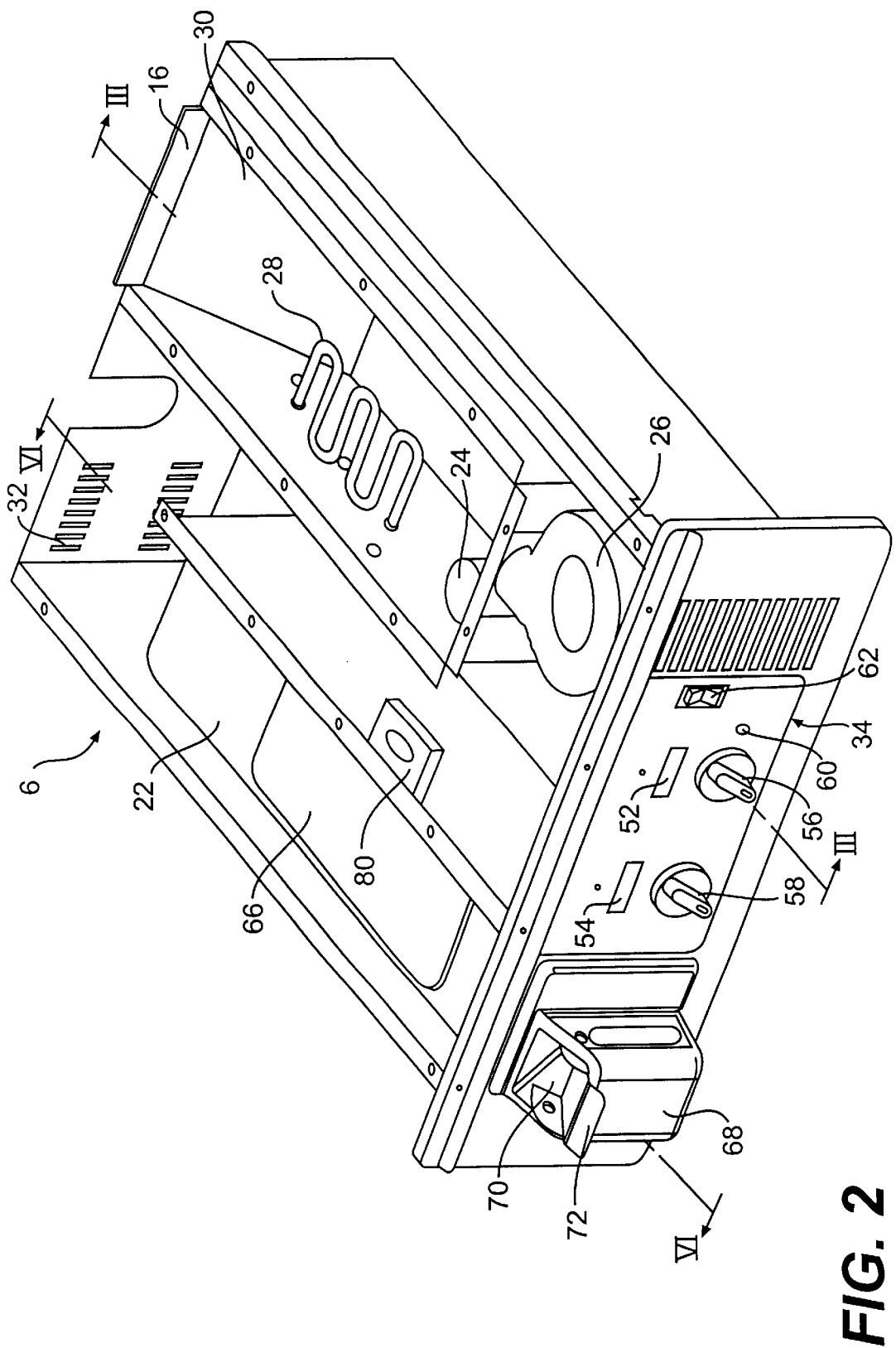
FIG. 2 is a perspective view of a module according to a preferred embodiment.

The main components of the module 6 are shown in FIG. 2 to include a reservoir 22, a steam generator 24, a blower 26, and an air heater 28. Generally,. the reservoir 22 supplies water to the steam generator 24 to produce steam. The blower 26 propels a stream of air through a chamber 30 past the steam generator 24 and the air heater 28, producing a stream of hot, humid air for circulation throughout the cabinet 4. These components are mounted to a modular housing 32 provided with a control panel 34 on its front portion.

Figure 3A:
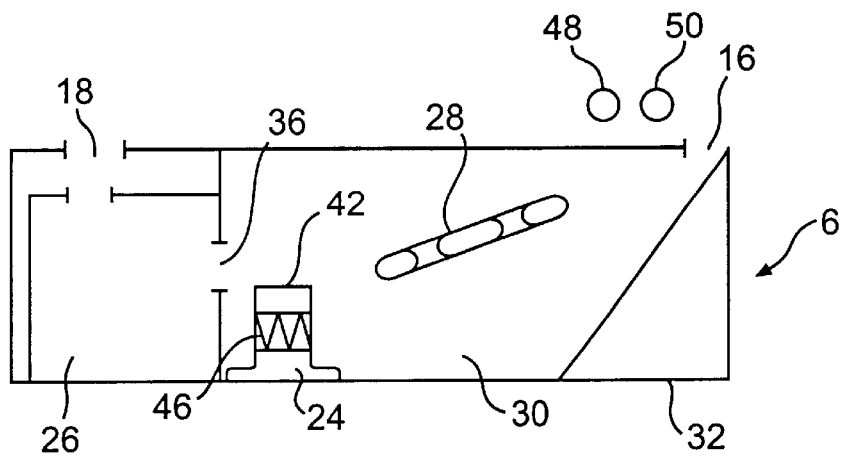
FIG. 3A is a cross-sectional view of the nodule along line III—III in FIG. 2.

With reference to FIG. 3A, the blower 26 is adapted to draw air (from the return air flow paths 14) through the modular opening 18, and propel air into the chamber 30 through an air intake 36 adjacent the blower 26. Thus, the air intake 36 is aligned in flow communication with the return air flow paths 14. Within the chamber and downstream from the air intake 36 are the steam generator 24, the air heater 28, and finally the exhaust vent 16.

Figure 3B:
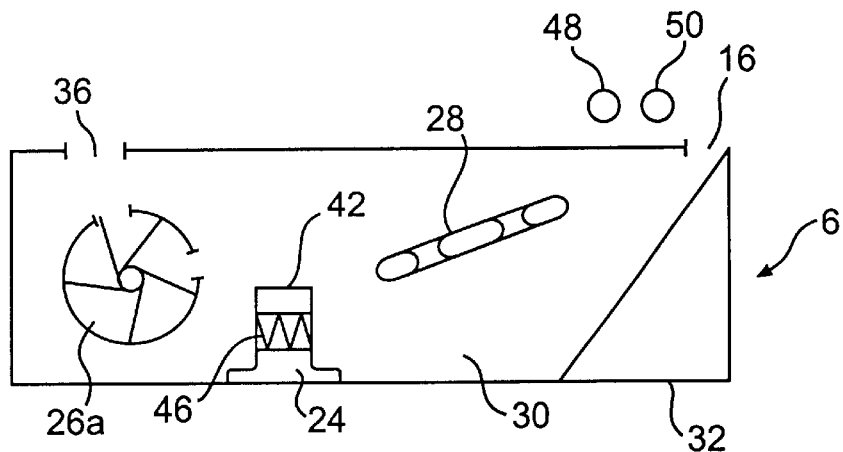
FIG. 3B is a cross-sectional view of the module shown in FIG. 3A according to a third alternative embodiment.

In a preferred embodiment, the blower 26 is a motor-driven centrifugal-type blower provided outside the chamber 30. Other types of blowers could be used, such as, but not limited to, a tangential-type blower. An alternative embodiment utilizing a tangential-type blower 26a is shown in FIG. 3B. Note that depending on the type of blower used, the blower can be provided adjacent the air intake 36 either outside or inside the chamber 30. In the alternative embodiment shown in FIG. 3B, the blower 26a is provided within the interior of the chamber 30, and the air intake 36 is aligned in flow communication with the return air flow paths 14.

Figure 4:
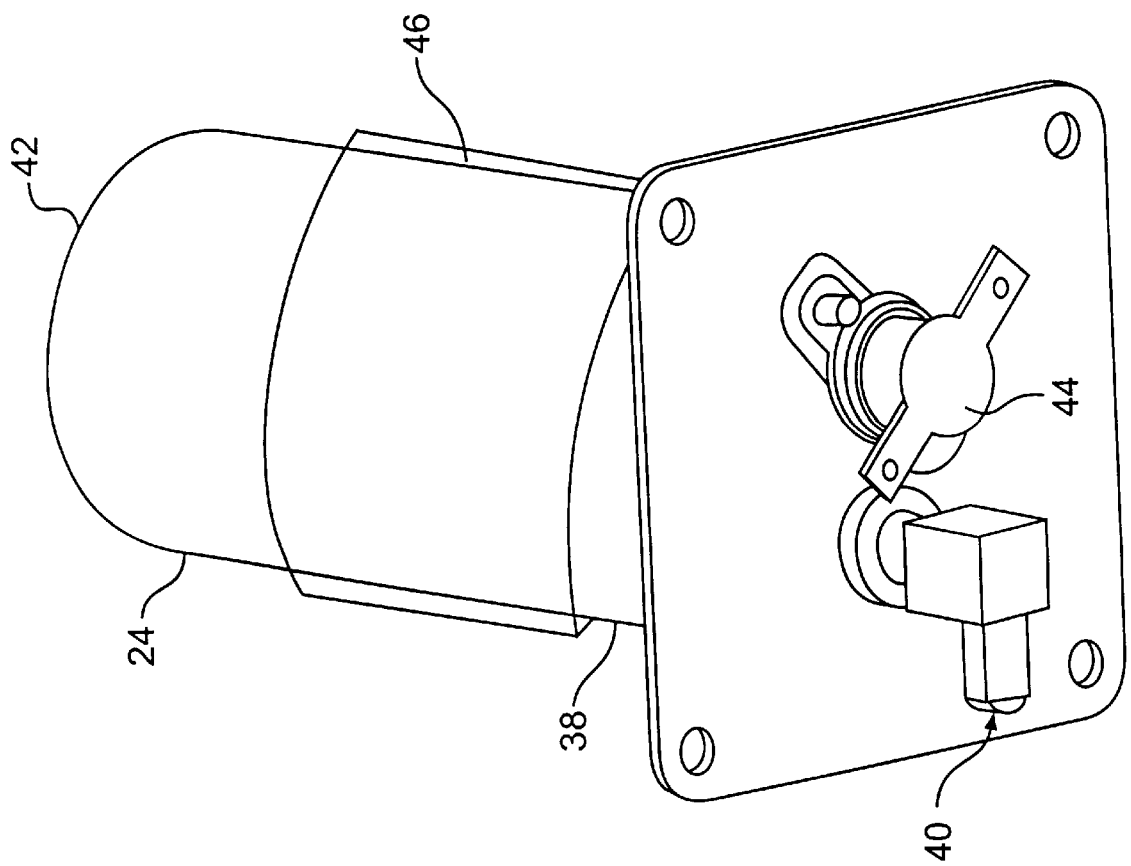
FIG. 4 is a perspective view of a steam generator.

Referring to FIGS. 2, 3A, and 4, the steam generator 24 is provided within the interior of the chamber 30 downstream from the blower 26. The steam generator 24 includes a vessel 38 which has a capacity for holding a volume of water, and a water inlet 40 which feeds into the bottom of the vessel 38. In this non-limiting example, the steam generator is generally cylindrical in shape. The steam generator 24 also has et steam outlet 42 in flow communication with the interior of the chamber 30. The steam generator 24 can be equipped with a thermal cut-off switch 44, the operation of which will be discussed below.

A heater 46 disposed on an external surface of the steam generator 24 provides means for heating the steam generator. In one non-limiting example, the heater 46 is a 350 watt band heater manufactured by Watlow (Product Code No. MB2A1AN2). However, other types of heaters could be used, including, but not limited to, an immersion heater provided within the steam generator. By arranging the steam generator 24 and the heater 46 in this manner, a very efficient system is achieved. The heater 46 heats water in the steam generator pan 38 while also heating air within the interior of the chamber 30. Even when the heater is an immersion-type heater located within the steam generator, whatever heat dissipates through the sidewalls of the steam generator is applied to heat the air within the chamber. Although in a preferred embodiment the external surface of the steam generator is located entirely within the chamber, the steam generator need only be provided substantially within the chamber. In the case of an external band heater, this means that at least a portion of the external surface of the steam generator with a heater applied thereto is located within the chamber. In the case of an internal immersion heater, this means that at least a portion of the external surface of the steam generator through which heat dissipates is located within the chamber.

The means for heating the air consists of the air heater 28, which, in the embodiment shown in FIG. 3A, partially traverses the interior of the chamber downstream from the steam generator 24 and is preferably disposed in an inclined position. A 1650 watt tubular heater with a relatively low wattage density is one example of a heater that can be used for this purpose. The means for heating the air could also comprise other types of heaters, disposed so that they either partially or fully traverse the flow of air or disposed on walls of the chamber 30. In fact, the means for heating the air could simply be the steam generator heater 46, in which case the means for heating the steam generator and the means for heating the air are the same.

Figure 3C:
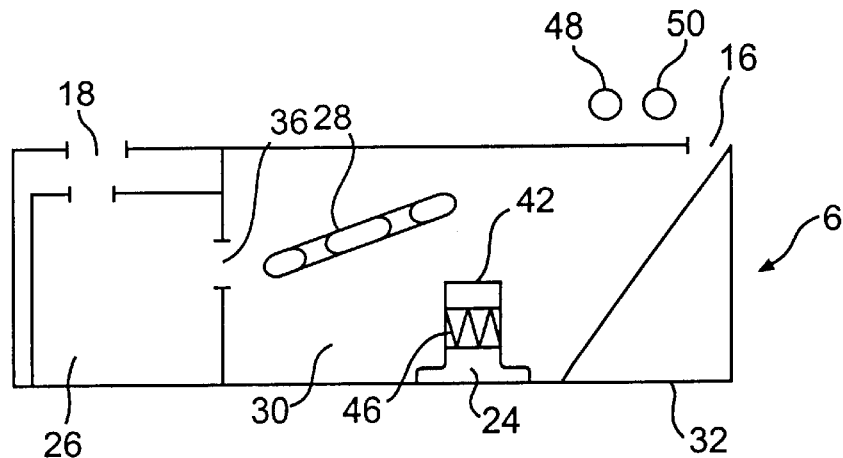
FIG. 3C is a cross-sectional view of the module shown in FIG. 3A according to a fourth alternative embodiment.

In an alternative embodiment, as shown in FIG. 3C, the positions of the air heater 28 and the steam generator 24 are reversed. In this case, the air heater 28 is positioned intermediate the air intake 36 and the steam generator 24, and the steam generator 24 is positioned intermediate the air heater 28 and the exhaust vent 16.

As illustrated in FIG. 3A, a temperature sensor 48 and a relative humidity sensor 50 are preferably provided within the cabinet 4 and outside of the chamber 30 in order to detect the temperature and relative humidity of air flowing therein. The temperature sensor 48 can be, for example, a. LM-34 solid state temperature sensor manufactured by National Semiconductor of Santa Clara, Calif. The relative humidity sensor 50 can be, for example, a HC100 thin-film capacitance relative humidity sensor manufactured by Panametrics of Waltham, Mass. In the embodiment shown, each of these sensors is positioned in the cabinet a sufficient distance from the steam generator 24 and the air heater 28 so as to be able to accurately detect the true conditions of the air flow.

As shown in FIG. 2, the control panel 34 has a digital temperature display 52 and a digital relative humidity display 54 which normally display the temperature and relative humidity of the air flow as detected by the sensors 48 and 50. A temperature dial 56 and a relative humidity dial 58 allow a user of the apparatus to set the desired temperature and relative humidity, respectively. In this embodiment, the user can view the temperature setting by depressing a push-to-read-setpoint button 60 provided on the control panel 34, while the relative humidity dial is calibrated to provide a range of settings from "crisp" to moist. A controller (not shown) is linked by conventional means to the sensors 48 and 50 and the dials 56 and 58. A main power switch 62 operates the blower 26.

To this point, the description of the module 6 has focused on the right side portion of the module. On the left side portion, as shown in FIG. 2, the reservoir 22 is detachably mounted to the modular housing 32. A guide rail 64, shown in FIG. 5, facilitates sliding the reservoir 22 in and out of the front of the module 6. The reservoir 22 has a removable lid 66, which opens to permit cleaning of the interior of the reservoir 22. A forward portion 68 of the reservoir 22 protrudes from the modular housing 32. On the forward portion 68, a fill spout 70 with a pivotable lid 72 is provided, thus enabling a user of the apparatus to fill the reservoir 22 with water without having to remove the reservoir 22 from the module 6.

Figure 5:
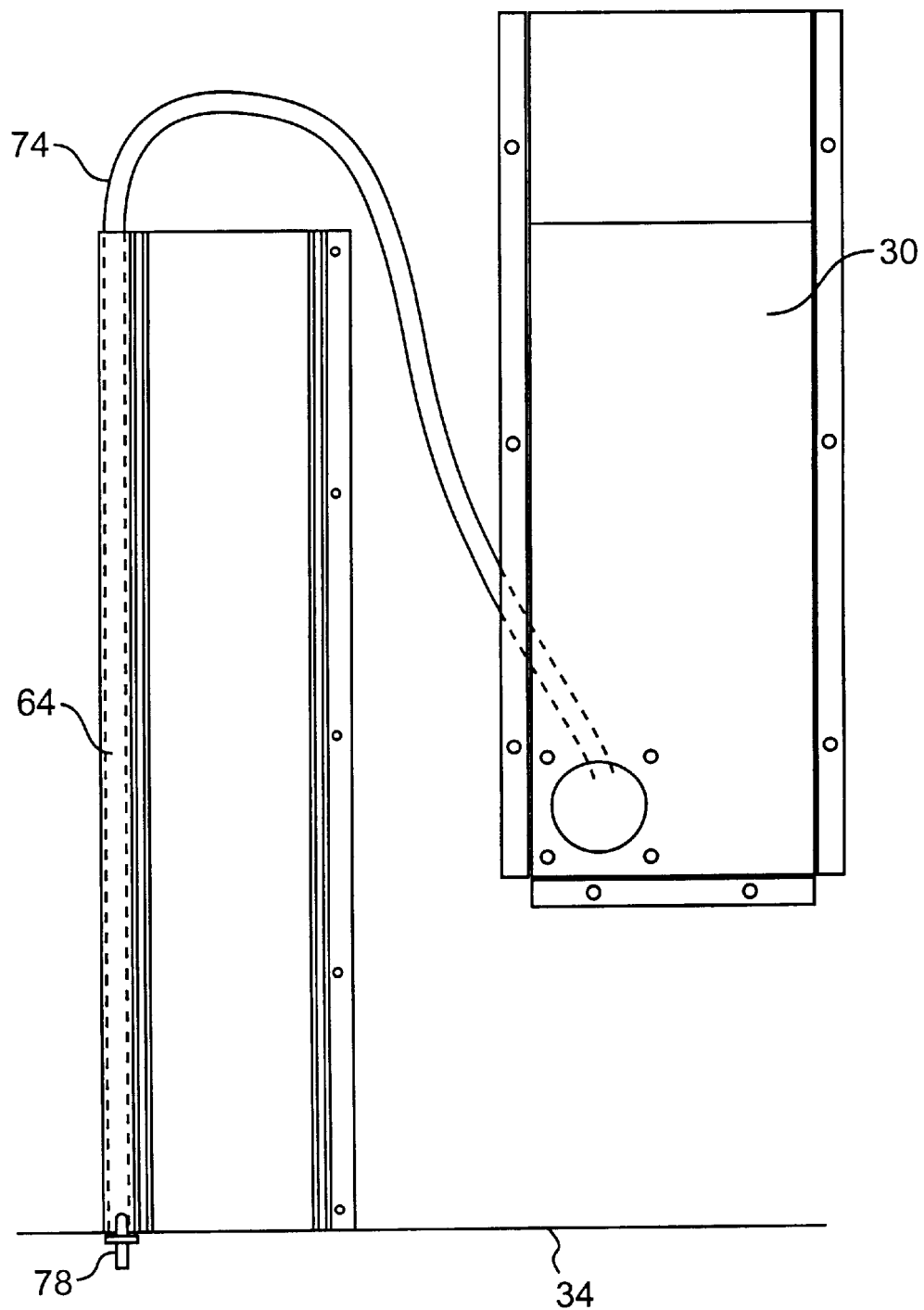
FIG. 5 is a schematic view of the connection between a reservoir and the steam generator.
Figure 6A:
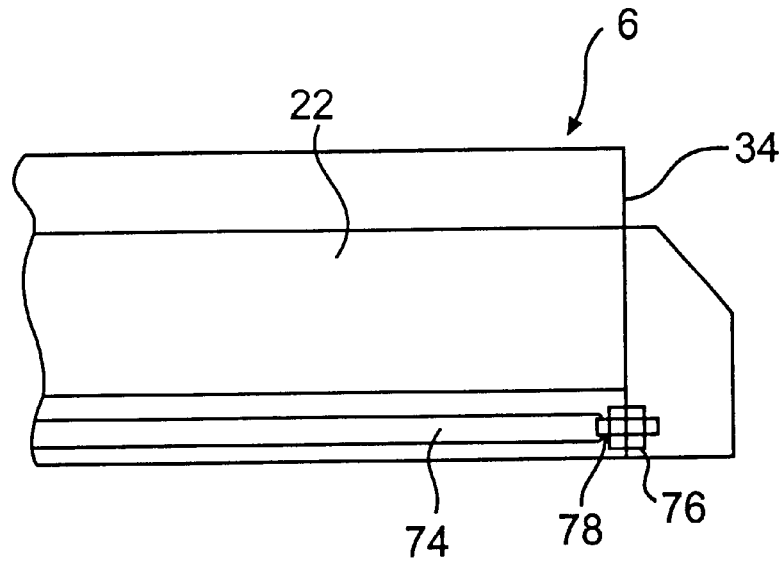
FIG. 6A is a cross-sectional view along line VI—VI in FIG. 2, showing the reservoir mounted to the module.
Figure 6B:
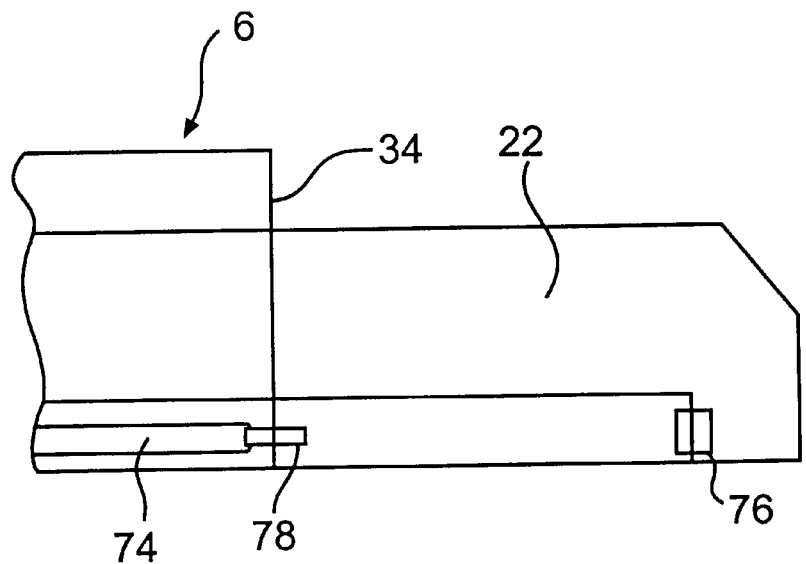
FIG. 6B is a cross-sectional view along line VI—VI in FIG. 2, showing the reservoir partially detached from the module.

FIGS. 5, 6A, and 6B illustrate the connection of the reservoir 22 to tubing 74, which in turn connects to the water inlet 40 of the steam generator pan 38. A coupling body 76 is inserted through a lower portion of the reservoir 22. A coupling insert 78 adapted for engagement with the coupling body 76 protrudes on one end from the face of the modular housing 32. At the other end, the coupling insert 78 is connected to the tubing 74. Suitable coupling bodies and coupling inserts are available from Colder Products Company of St. Paul, Minn. (Part Nos. PLCD 100-04 and PLC 420-04, respectively).

When the reservoir 22 is mounted to the modular housing 32, as shown in FIG. 6A, the "quick-disconnect" type coupling body 76 and the coupling insert 78 engage to allow water to flow between the reservoir 2.2 and the steam generator 24. Because the coupling body 76 and the water inlet 40 are provided near the bottoms of the reservoir 22 and the steam generator 24, respectively, substantially equal water levels are obtained in the reservoir 22 and the steam generator 24. The diameter of the tubing 74 is sufficiently narrow so that water in the reservoir 22 can be held at a different, generally lower, temperature than water in the steam generator 24.

In a preferred embodiment, the reservoir 22 has a substantially larger capacity for holding water than does the steam generator 24. Therefore, a small volume of water can quickly and efficiently be converted into steam in the steam generator 24, while a much larger volume of water is retained in the reservoir 22 for replenishment purposes.

When the reservoir 22 is detached from the modular housing 32, as shown in FIG. 6B, the coupling body 76 and the coupling insert 78 disengage, and the coupling body 76 seals the water within the reservoir 22. In the embodiment shown, after the reservoir 22 is detached, water remaining in the tubing 74 and the steam generator 24 drains out of the coupling insert 78 into a collecting pan (not shown) placed beneath the apparatus. As an alternative, however, the coupling insert could be provided with an automatic shut-off valve to prevent the water from draining.

Next, with reference to the structures described above, the operation of the food storage apparatus 2 will be described. The main power switch 62 turns on the blower 26, which propels a stream of air through the air intake 36 of the chamber 30, past the steam generator 24 and air heater 28, and out the exhaust vent 16. When running, the blower 26 creates a negative pressure zone near the modular opening 18 and a positive pressure zone near the exhaust vent 16. Thus, the stream of air is circulated (as shown by the arrows in FIG. 1A) from the feed duct 12, through the plurality of air channels 20, and back to the module opening 18 via the return air flow paths 14.

A user can adjust the temperature dial 56 and the relative humidity dial 58 to desired settings. The temperature sensor 48 and the relative humidity sensor 50 detect the temperature and relative humidity of the stream of air, and relay this information to the controller. The controller determines whether the detected temperature and relative humidity correspond to the respective settings, and if not turns on the air heater and/or steam generator heater until the desired settings are reached.

In a preferred embodiment, the steam generator 24 is equipped with the thermal cut-off switch 44 shown in FIG. 4. The switch 44 opens to cut off power supplied to the steam generator heater 46 whenever a thermal sensor, which is preferably built into the switch 44, determines that there is an inadequate volume of water in the steam generator vessel 38. At approximately the same time that the switch 44 opens, a buzzer 80 sounds to alert a user of the apparatus that water needs to be added to the water reservoir 22. What is considered to be an inadequate volume of water in the steam generator depends on the type of heater used, as well as the dimensions and materials of the various components. Simply stated, the water volume is inadequate whenever applying further heat to the steam generator would in any way damage or deteriorate any of the system components or not allow the required humidity levels to be reached.

While the present invention has been described with respect to what are presently considered to be the preferred embodiments, it is understood that the invention is not limited to the disclosed embodiments. To the contrary, the invention is intended to cover various modifications and equivalent arrangements included within the spirit and scope of the appended claims. The scope of the following claims Ls to be accorded the broadest interpretation so as to encompass all such modifications and equivalent structures and functions.

What is claimed is:

1. An apparatus, comprising:
   a chamber having an air intake and an exhaust vent;
   a blower disposed adjacent the air intake and adapted to propel a stream of air toward the exhaust vent;
   a steam generator; and
   a heater disposed at least partially within an interior of said chamber so as to heat simultaneously said steam generator and the interior of said chamber.

2. An apparatus according to claim 1, wherein said heater is disposed on an external surface of said steam generator.

3. An apparatus according to claim 2, wherein said heater is a band heater.

4. An apparatus according to claim 2, wherein said steam generator is disposed substantially within the interior of said chamber.

5. An apparatus according to claim 1, further comprising a second heater disposed within the interior of said chamber.

6. An apparatus according to claim 5, wherein said second heater is disposed at a position intermediate said steam generator and said exhaust vent.

7. An apparatus according to claim 1, wherein said blower is disposed outside said chamber.

8. An apparatus, comprising:
   a housing;
   a chamber within said housing having an air intake and an exhaust vent;
   a blower disposed adjacent the air intake for blowing a stream of air toward the exhaust vent;
   a reservoir detachably mounted to said housing and adapted to hold a volume of water;
   a steam generator having a water inlet adapted to receive a fraction of the volume of water held in said reservoir, and a steam outlet through which steam can be discharged into said chamber; and
   a heater disposed at least Partially within an interior of said chamber so as to heat simultaneously said steam generator and the interior of said chamber.

9. An apparatus according to claim 8, wherein said blower is disposed outside said chamber.

10. An apparatus according to claim 8, wherein said means for heating said steam generator comprises a heater disposed on an external surface of said steam generator.

11. An apparatus according to claim 8, wherein said reservoir includes a coupling body adapted to be engaged with a coupling insert of said housing, so that when said reservoir is mounted to said housing, the coupling body and the coupling insert engage to connect said reservoir and the water inlet of said steam generator in flow communication, and when said reservoir is detached from said housing, the coupling body and the coupling insert disengage to seal the volume of water in said reservoir.

12. A module adapted to generate a stream of hot, humid air, comprising:
   a housing;
   a chamber disposed within said housing and having an air intake and an exhaust vent;
   a blower disposed adjacent the air intake and adapted to propel a stream of air through an interior of said chamber toward the exhaust vent;
   a reservoir adapted to hold a volume of water;
   a steam generator disposed substantially within the interior of said chamber and having a water inlet in flow communication with said reservoir and a steam outlet in flow communication with the interior of said chamber;
   a first heater disposed on an external surface of said steam generator; and
   a second heater disposed within the interior of said chamber.

13. A module according to claim 12, wherein said reservoir is detachably mounted to said housing.

14. An apparatus according to claim 13, wherein said reservoir includes a coupling body adapted to be engaged with a coupling insert of said housing, so that when said reservoir is mounted to said housing, the coupling body and the coupling insert engage to connect said reservoir and the water inlet of said steam generator in flow communication, and when said reservoir is detached from said housing, the coupling body and the coupling insert disengage to seal the volume of water in said reservoir.

15. A module according to claim 12, wherein a capacity of said reservoir for holding water is substantially larger than a capacity of said steam generator for holding water.

16. A module according to claim 12, further comprising a temperature sensor and a humidity sensor, each disposed outside of said chamber.

17. A module according to claim 16, further comprising a controller for controlling power supplied to said first heater and said second heater in response to conditions detected by said temperature sensor and said humidity sensor.

18. A module according to claim 12, wherein said steam generator is disposed at a position intermediate said blower and said second heater element.

19. A module according to claim 12, further comprising a thermal cut-off switch that opens to prevent power from being supplied to said first heater whenever there is an inadequate volume of water in said steam generator.

20. A module according to claim 19, further comprising buzzer that sounds to alert a user of the module whenever there is an inadequate volume of water in said steam generator.

21. A module according to claim 12, wherein said blower is disposed outside said chamber.

22. A module according to claim 12, wherein at least a portion of said steam generator having said first heater disposed thereon is disposed within the interior of said chamber.

23. An apparatus adapted to circulate a stream of hot, humid air, comprising:
   a cabinet having a feed duct, a return air flow path, and a plurality of air channels allowing for flow communication between the feed duct and the return air flow path; and
   a module, comprising:
   a housing;
   a chamber provided within said housing through which a stream of air can flow from an air intake at one end of said chamber to an exhaust vent at another end of said chamber, the air intake being aligned in flow communication with the return air flow paths, and the exhaust vent being aligned in flow communication with the feed duct;
   a motor-driven blower disposed adjacent the air intake and adapted to propel the stream of air received via the return air flow paths through said chamber toward the exhaust vent and into the feed duct;
   a reservoir detachably mounted to said housing and adapted to hold a volume of water having a level;
   a steam generator assembly disposed substantially within said chamber and including a water inlet adapted to receive water from said reservoir, a vessel adapted to hold a volume of water having substantially the same level but a lesser volume than the volume of water held in said reservoir, and a steam outlet through which steam can be discharged into said chamber;

a first heater disposed within said chamber on an external surface of said steam generator;

a second heater disposed within said chamber at a position intermediate said steam generator and the exhaust vent;

a temperature sensor disposed within said cabinet for measuring the temperature of the stream of air as it is propelled through said chamber; and a humidity sensor disposed within said cabinet for measuring the relative humidity of the stream of air as it is propelled through said chamber.

24. An apparatus according to claim 23, wherein said first heater is a band heater.

25. A module according to claim 23, further comprising a thermal cut-off switch that opens to prevent power from being supplied to said first heater whenever the volume of water held in the pan is inadequate, and a buzzer that sounds as said thermal switch opens in order to alert a user of the apparatus that the volume of water held in the pan is inadequate.

26. An apparatus according to claim 23, wherein said blower is disposed outside said chamber.

27. An apparatus according to claim 23, wherein said module is disposed at a lower portion of said apparatus.

28. An apparatus according to claim 23, wherein said reservoir includes a coupling body adapted to be engaged with a coupling insert of said housing, so that when said reservoir is mounted to said housing, the coupling body and the coupling insert engage to connect said reservoir and the water inlet of said steam generator in flow communication, and when said reservoir is detached from said housing, the coupling body and the coupling insert disengage to seal the volume of water in said reservoir.

* * * * *

UNITED STATES PATENT AND TRADEMARK OFFICE
CERTIFICATE OF CORRECTION

PATENT NO.      : 6,157,006
DATED           : December 5, 2000
INVENTOR(S)     : Willard J. Sickles, et al.

Page 1 of 1

It is certified that error appears in the above-identified patent and that said Letters Patent is hereby corrected as shown below:

Column 1,
Line 40, "cf" should read -- of --.

Column 3,
Line 7, "nodule" should read -- module --.

Column 4,
Line 25, "et" should read -- a --.

Column 5,
Line 59, "2.2" should read -- 22 --.

Column 6,
Line 65, "Ls" should read -- is --.

Column 7,
Line 36, "Partially" should read -- partially --.

Signed and Sealed this

Thirteenth Day of November, 2001

Attest:

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,157,006
DATED : December 5, 2000
INVENTOR(S) : Willard J. Sickles, et al.

It is certified that error appears in the above-identified patent and that said Letters Patent is hereby corrected as shown below:

Column 1,
Line 50, "cf" should read -- of --.

Column 3,
Line 7, "nodule" should read -- module --.

Column 4,
Line 25, "et" should read -- a --.

Column 5,
Line 59, "2.2" should read -- 22 --.

Column 6,
Line 65, "Ls" should read -- is --.

Column 7,
Line 36, "Partially" should read -- partially --.

Signed and Sealed this

Twenty-seventh Day of November, 2001

Attest:

*Nicholas P. Godici*

NICHOLAS P. GODICI
*Attesting Officer*     *Acting Director of the United States Patent and Trademark Office*